United States Patent
Biller et al.

(10) Patent No.: US 9,566,936 B2
(45) Date of Patent: Feb. 14, 2017

(54) ACTUATOR AND VEHICLE PROTECTION SYSTEM

(71) Applicant: TRW Automotive GmbH, Alfdorf (DE)

(72) Inventors: Joachim Biller, Lorch (DE); Silvia Feifel, Aalen (DE); Karl-Heinz Koeppel, Waldstetten (DE); Senra Oezkan, Stuttgart (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/402,779

(22) PCT Filed: May 28, 2013

(86) PCT No.: PCT/EP2013/001567
§ 371 (c)(1),
(2) Date: Nov. 21, 2014

(87) PCT Pub. No.: WO2013/178351
PCT Pub. Date: Dec. 5, 2013

(65) Prior Publication Data
US 2015/0130173 A1    May 14, 2015

(30) Foreign Application Priority Data

May 31, 2012 (DE) .......... 10 2012 010 772
Sep. 21, 2012 (DE) .......... 10 2012 018 674

(51) Int. Cl.
*B60R 21/239* (2006.01)
*B60R 21/04* (2006.01)
(Continued)

(52) U.S. Cl.
CPC ............ *B60R 21/239* (2013.01); *B60R 21/04* (2013.01); *B60R 21/16* (2013.01); *B60R 21/26* (2013.01);
(Continued)

(58) Field of Classification Search
CPC ...... B60R 21/264; B60R 21/276; B60R 21/04; B60R 21/16; B60R 21/26; B60R 2021/2765; B60R 2021/2395; C06D 5/00; F03G 7/065
See application file for complete search history.

(56) References Cited

U.S. PATENT DOCUMENTS

| 5,312,152 A | * | 5/1994 | Woebkenberg, Jr. .. B64G 1/641 294/82.24 |
| 5,727,391 A | * | 3/1998 | Hayward ............... B25J 9/1085 248/636 |

(Continued)

FOREIGN PATENT DOCUMENTS

| DE | 202005001000 | 7/2005 |
| DE | 202006020070 | 10/2007 |
| DE | 102010004162 | 12/2010 |

*Primary Examiner* — Paul N Dickson
*Assistant Examiner* — Timothy Wilhelm
(74) *Attorney, Agent, or Firm* — Tarolli, Sundheim, Covell & Tummino LLP

(57) ABSTRACT

An actuator, especially for a vehicle protection system, comprises at least one wire (14) variable in shape depending on temperature made from a shape memory alloy and an elongate pyrotechnical element (12) connected to the shape-variable wire (14) so that upon ignition of the pyrotechnical element (12) the wire (14) is heated and experiences a change of length. The vehicle protection system is, for example, an airbag system comprising an airbag and a regulating mechanism for the internal airbag pressure, wherein the wire (14) of the actuator (10) is connected to the regulating mechanism so that a change of shape of the wire (14) exerts a force on the regulating mechanism.

16 Claims, 13 Drawing Sheets

(51) Int. Cl.
 *B60R 21/16* (2006.01)
 *B60R 21/26* (2011.01)
 *F03G 7/06* (2006.01)
 *B60R 21/264* (2006.01)
 *B60R 21/276* (2006.01)
 *C06D 5/00* (2006.01)

(52) U.S. Cl.
 CPC ........... *B60R 21/264* (2013.01); *B60R 21/276* (2013.01); *C06D 5/00* (2013.01); *F03G 7/065* (2013.01); *B60R 2021/2395* (2013.01); *B60R 2021/2765* (2013.01)

(56) References Cited

U.S. PATENT DOCUMENTS

| | | | | |
|---|---|---|---|---|
| 5,771,742 A * | 6/1998 | Bokaie | ................... | B64G 1/22 337/140 |
| 6,174,008 B1 * | 1/2001 | Kramer | ................... | B60R 19/40 293/118 |
| 6,659,631 B2 * | 12/2003 | Butera | ................... | B60Q 1/076 362/278 |
| 6,760,211 B2 * | 7/2004 | Bueno Ruiz | ........... | B64G 1/222 361/160 |
| 6,834,835 B1 * | 12/2004 | Knowles | ................... | B64C 3/54 244/198 |
| 6,945,559 B2 * | 9/2005 | Kassman | ............... | B60R 21/239 280/735 |
| 6,971,671 B2 * | 12/2005 | Schneider | ............. | B60R 21/239 280/739 |
| 7,498,926 B2 * | 3/2009 | Browne | ............... | B60K 11/085 123/41.06 |
| 7,594,697 B2 * | 9/2009 | Browne | ................... | A47C 7/38 297/216.12 |
| 7,600,301 B2 * | 10/2009 | Rudduck | ............. | F16B 1/0014 24/602 |
| 7,967,098 B2 * | 6/2011 | Choi | ....................... | B60R 21/36 180/274 |
| 7,967,339 B2 * | 6/2011 | Usoro | ..................... | B60R 22/03 180/268 |
| 8,104,793 B2 * | 1/2012 | Browne | ............. | B60N 2/42709 180/271 |
| 8,157,300 B2 * | 4/2012 | Niskanen | ............ | E05B 47/0009 292/201 |
| 8,888,136 B2 * | 11/2014 | Browne | ................... | B60R 21/13 180/282 |
| 2003/0214125 A1 | 11/2003 | Schneider et al. | | |
| 2004/0056459 A1 | 3/2004 | Kassman et al. | | |
| 2006/0125291 A1 * | 6/2006 | Buravalla | ............... | B62D 21/15 296/204 |
| 2006/0163856 A1 | 7/2006 | Lehmann | | |
| 2007/0182146 A1 | 8/2007 | Browne et al. | | |
| 2008/0127684 A1 * | 6/2008 | Rudduck | ............. | E05B 47/0009 70/77 |
| 2010/0116580 A1 | 5/2010 | Choi | | |
| 2010/0176581 A1 | 7/2010 | Usoro et al. | | |
| 2013/0221763 A1 * | 8/2013 | Pinto, IV | ................. | F16P 3/00 307/328 |

* cited by examiner

Fig. 29
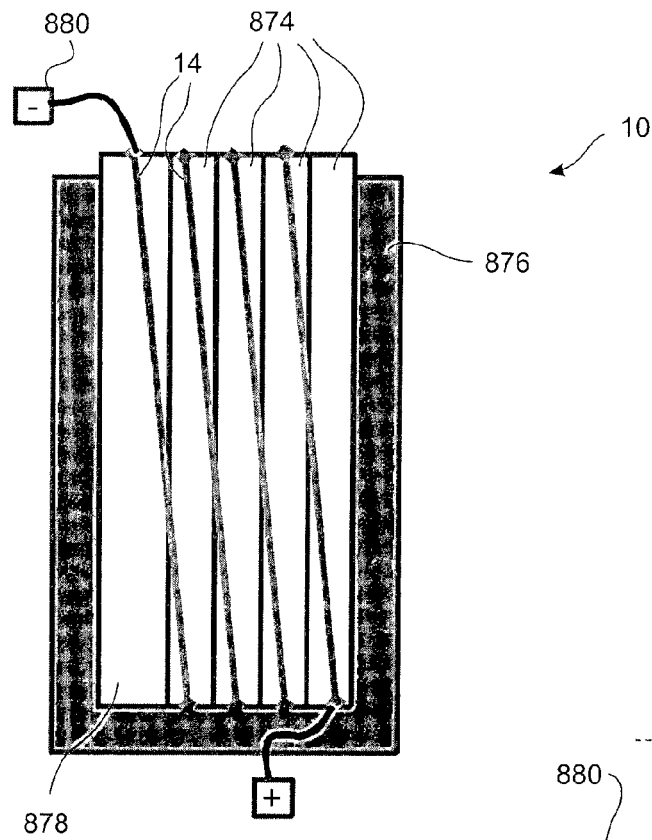
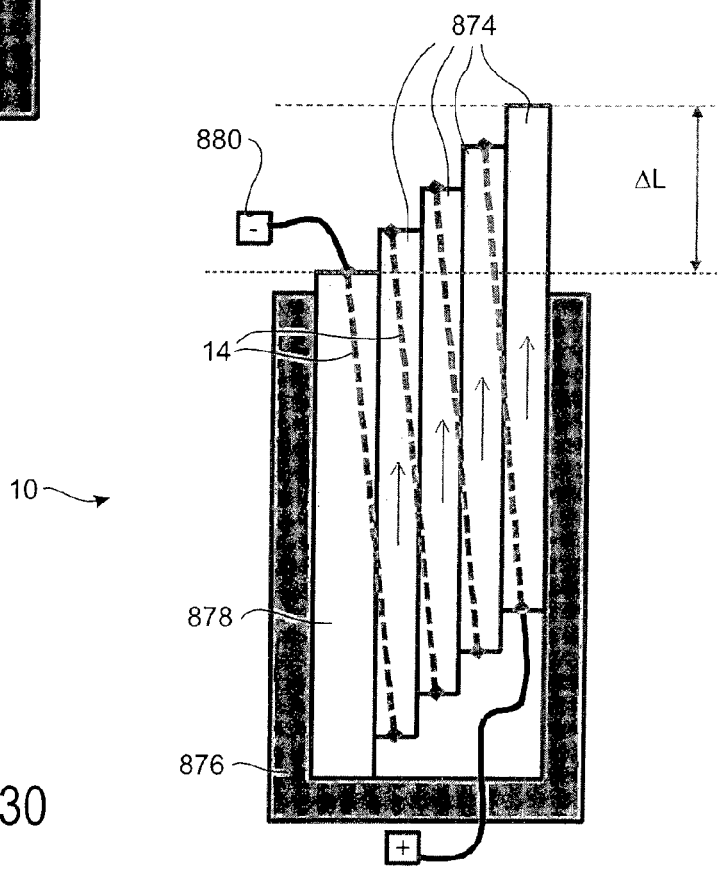
Fig. 30

ACTUATOR AND VEHICLE PROTECTION SYSTEM

RELATED APPLICATIONS

This application corresponds to PCT/EP2012/001567, filed May 23, 2013, which claims the benefit of German Application Nos. 10 2012 010 772.3, filed May 31, 2012 and 10 2012 018 674.6, filed Sep. 21, 2012, the subject matter, of which are incorporated herein by reference in their entirety.

BACKGROUND OF THE INVENTION

The invention relates to an actuator and a vehicle protection system comprising an actuator, especially an airbag system.

For the protection of vehicle occupants or persons outside the vehicle time is a critical factor. Triggering the protection systems such as e.g. airbags, belt tensioners or a steering column dampening has to take place already milliseconds after a crash so that these systems car develop a sufficient protective effect.

Airbags, especially in vehicle safety systems, which are intended to dampen the impact of a person in the case of crash upon activation thereof are filled by a compressed gas source and are inflated from a folded state. In order to achieve this change of shape within short time and in order to take also great forces acting during crash into account, the airbag is tightly inflated so that high internal pressure is prevailing in its interior. In this way the absorbing effect of the airbag is also given in the case of a tall and heavy person. For a light, petite person or an unfavorable seating position with respect to the airbag, however, too high internal pressure of the airbag may inhibit the restraining effect. For this reason, airbags are frequently provided with exhaust orifices through which gas can escape to reduce the internal pressure.

It is also known to first separate a partial volume of the airbag and fill the same only on demand, for example by destroying a separating tear seam.

In order to adjust the optimum internal pressure of the airbag as needed depending on the situation, various mechanisms are used by which exhaust orifices, for example, can be released or closed. Solutions for transmitting the trigger pulse from the control to the respective mechanism at the protection system are usually complicated and expensive, however.

SUMMARY OF THE INVENTION

It is the object of the invention to provide an inexpensive actuator having an especially quick trigger time.

In accordance with the invention, an actuator, especially for a vehicle protection system, includes at least one wire variable in shape depending on temperature made from a shape memory alloy and an elongate pyrotechnical element which is connected to the shape-variable wire so that the wire is heated upon ignition of the pyrotechnical element and experiences a change of length. The extremely quick combustion of the pyrotechnical element at a rate of up to 8000 m/s while high temperature is developed results in rapid heat transfer to the shape-variable wire especially almost simultaneously over the entire expansion of the wire. It has turned out that heating by ignition of a pyrotechnical charge in the vicinity of a wire entails a definitely quicker heat transfer to the wire than heating by current flow. An actuator according to the invention allows achieving e.g. trigger times of less than one millisecond.

The wire is preferably connected to at least one component to be moved the displacement of which actuates e.g. a regulating mechanism for the internal pressure of an airbag, releases an unlocking mechanism or brings about any other desired effect.

Preferably the wire consists of a known shape memory alloy and, due to a temperature-dependent change of the crystalline structure, at different temperatures takes different shapes. This change of shape takes place within less than one millisecond with appropriate heat impact. Usually this process is reversible, however when a material-dependent maximum temperature is exceeded, this reversibility may get lost. This is not crucial to the invention, however, as for operating the actuator especially for a vehicle protection system usually also a non-recurring change of shape is sufficient. The actuator can as well be designed so that the shape changing process is reversible, however.

It is also possible to provide, apart from the pyrotechnical element, a further heat source, e.g. by a flow of electric current through the wire, so that the actuator can also be used for further reversible trigger movements.

It has turned out that both the rate of the change of shape and the force applied by the change of shape of the wire are easily sufficient to trigger processes in a vehicle protection system, e.g. to actuate a regulating mechanism for the internal pressure of an airbag.

Plural wires connected to the same or to different components to be moved and being healed by a joint pyrotechnical element can be provided in the actuator.

When the wire is heated simultaneously over its entire length, an especially rapid change of shape takes place. Therefore it is advantageous when the pyrotechnical element extends substantially over the entire length of the shape-variable wire.

It is equally helpful for a rapid heat transfer when the wire extends through the pyrotechnical element at least in portions and/or outside of the pyrotechnical element at least in portions.

Direct contact between the pyrotechnical element and the shape-variable wire increases the heat transfer to the wire. However, it is also possible to arrange the wire at a distance from the pyrotechnical element.

Preferably, the wire is tightly fastened to the vehicle or a component fixed on the vehicle at one end and is tightly fastened to the component to be moved at the other end. This also ensures adequate transfer of the tensile force.

According to a first advantageous embodiment of an actuator, the pyrotechnical element is a shock tube. Shook tubes or "shock tubes" are plastic tubes, for example, which are coated inside with a pyrotechnical material that burns off along the tube upon being ignited. An ignition pulse is transmitted from one end of the shock tube to the other, at the same time heat is generated inside the shock tube by the combustion of the pyrotechnical material. In accordance with the invention, this heat impact is used to heat the wire made from a shape memory alloy and in this way to cause its deformation.

The pyrotechnical element may also comprise a fabric tube, for example instead of a plastic tube made of solid material. The fabric tube is preferably coated with pyrotechnical material. The coating is advantageously applied to the inside of the fabric tube and preferably the wire extends through the fabric tube.

Alternatively, the pyrotechnical element can also be designed as a member coated with a pyrotechnical material.

The member can be rigid or deformable at least in portions and can be at least partially solid.

It is possible to provide, for example along the member, a groove in which the shape-variable wire extends. It may suffice to provide only the region in the direct vicinity of the wire with a pyrotechnical coating.

According to another embodiment, the pyrotechnical element is formed by a coating of pyrotechnical material applied to the wire itself.

The shape-variable wire can extend to be stretched along the pyrotechnical element.

It can also be advantageous for increasing the total length of the wire and thus the pulling distance and/or for being able to reduce the total length of the pyrotechnical element, to have the shape-variable wire extend in curved, especially helical or zigzag form, at least in portions.

In order to protect the surroundings of the pyrotechnical element against excessive heat impact, it is possible to provide heat insulation at the pyrotechnical element. The heat insulation may consist, for example, of a layer of an insulating material such as an aerogel layer. The use of an aerogel offers the advantage that the material is very light and has a fire-retardant effect.

Upon heating the wire preferably deforms so that it exerts a tensile force on the component to be moved. The wire may shorten or curve in portions so that the distance between the end of the wire fixed to the vehicle and the mounting of the wire on the regulating mechanism is reduced.

Before activation of the airbag system the wire can project from one end of the pyrotechnical element by a predetermined length. This predetermined length corresponds, for example, to the shortening experienced by the wire due to heating or to the tensile distance which the wire can apply.

The change of shape could also be designed, as a matter of course, so that the wire stretches and exerts a shear force on the element to be moved.

It is possible to provide a filter for filtering and/or absorbing gas generated in the actuator in order to reduce or prevent gas or heat emission to the surroundings.

In order to achieve quite large movements with a small constructed space, a linearly or rotationally cascading arrangement of plural slides connected to shape-variable wires can be used.

In preferred embodiments plural slides arranged to be movable linearly or rotationally or along a circular arc are arranged which are especially accommodated in a housing, wherein respective neighboring slides are connected by at least one shape-variable wire. Such cascading entails the fact that the displacing distance of the individual shape-variable wires adds up.

In this case the actuator preferably generates a shear force which is transmitted via the last slide of the cascade.

In this case, apart from a pyrotechnical heating also an electric heating of the shape-variable wires is considered as heat source. Current flows through these wires which are preferably connected in series or they are heated by an external electric heating.

Since a deflection of the wires can be dispensed with, only tow frictional forces occur.

The force generated in total can be easily increased by parallel arrangement of a plurality of such actuators.

A combination with further transmissions, e.g. lever arms, eccentrics or a gear system, is possible for generating a longer distance or a greater force.

It is a further object of the invention to provide an airbag system in which the internal pressure of the airbag can be influenced easily, reliably and inexpensively and especially a regulating mechanism can be actuated in a simple manner.

In accordance with the invention, for this purpose an airbag system is provided comprising an airbag including a regulating mechanism for the internal pressure of the airbag, the wire of the actuator being connected to the regulating mechanism so that a change of shape of the wire exerts a force on the regulating mechanism, which in turn entails a change of the internal pressure of the airbag.

The regulating mechanism may have any design and may serve, for example, for opening or closing exhaust orifices or for releasing further partial volumes of the airbag.

According to a first variant, the regulating mechanism is a venting mechanism and the airbag has at least one exhaust orifice to be opened and/or closed by the venting mechanism. For this, the wire is preferably connected to the venting mechanism so that a change of shape of the wire exerts a force on the venting mechanism which results in opening and/or closing the exhaust orifice.

For example, the venting mechanism may include a closing element fastened to the airbag, the wire of the actuator acting on the closing element. This closing element is located e.g. above an exhaust orifice and is removed from the exhaust orifice by the movement of the wire or is brought above the exhaust orifice so that the exhaust orifice is opened or closed by the force of the wire.

In a first preferred embodiment the closing element is fixed by at least one tear seam above the exhaust orifice, and the tensile force of the wire of the actuator detaches the closing element from the exhaust orifice so that the initially closed exhaust orifice is opened. In a first state with a first shape condition of the wire of the actuator in which the wire is preferably elongate no tensile force acts upon the closing element. In a second state after activation of the regulating mechanism, with a second shape condition of the wire of the actuator in which the wire is preferably shortened, the closing element is detached from the airbag by the acting tensile force.

According to a second preferred embodiment, in the first state with the first shape condition of the wire of the actuator the closing element is lifted off the exhaust orifice so that gas can escape from the exhaust orifice and the airbag and in the second state with the second shape condition of the wire it closes the exhaust orifice. In this case the use of a rigid, plate-like or flap-like closing element offers itself.

The first state also in this case is advantageously the state prior to activation of the actuator and of the regulating mechanism, and in its first shape condition the wire of the actuator is advantageously elongated. The second state preferably is the state after activation of the actuator and of the regulating mechanism, wherein the second shape condition of the wire may be a shortened shape or, resp., a shape curved in portions.

It is also possible, as a matter of course, to keep the exhaust orifice closed in the first state and to open it in the second state, as in the first embodiment.

In a third preferred embodiment the rim of the exhaust orifice is connected to the wire of the actuator so that a tensile force exerted by the wire reduces the surface area of the exhaust orifice. For this purpose, the rim of the exhaust orifice can be connected to the wire end at plural positions via strips or thread loops, for example, so that tension perpendicularly to the airbag wall contracts the rim of the exhaust orifice in funnel shape and thus closes the later. It is another option to lay a thread loop along the rim of the exhaust orifice which is arranged to be movable relative to the airbag fabric so that when pulling the thread the loop is pulled tight by the wire and the exhaust orifice is closed.

According to a fourth preferred embodiment, the venting mechanism includes plural specific threads in the airbag wall which are configured to be removable from the airbag wall upon tensile load, wherein the threads are connected to the wire of the actuator. For example, the threads may be interwoven with the warps and may keep the warps together more closely than this would be predetermined by the actual weaving structure in this portion of the airbag fabric. Upon removal of the specific threads by the tension exerted by the wire, the distance of the warps in this area is widened and the fabric becomes more permeable to gas. In this way an exhaust orifice is formed. Also, part of the warps could be pulled out per se; this, too, results in increased gas permeability of the fabric in a particular region which then constitutes the exhaust orifice.

In another advantageous embodiment the airbag comprises a partial volume which is separated in terms of flow from the residual airbag prior to activation of the actuator and the regulating mechanism, and the regulating mechanism is a ventilation mechanism connected to the wire so that upon activation of the airbag system gas flows into the separated partial volume.

According to a preferred embodiment, for example, the partial volume is initially separated by a tear seam, wherein the wire of the actuator exerts tension on the tear seam and the gas flows into the partial volume upon tearing of the tear seam. Thus, on the one hand, the volume and consequently the absorbing surface of the airbag are increased and, on the other hand, the internal pressure in the airbag is reduced as the gas contained in the airbag is distributed to a larger volume.

According to another advantageous embodiment. In a vehicle protection system an actuator is connected to an unlocking mechanism configured to release a loaded component upon activation of the actuator. Said loaded component can vary its position after release, whereby e.g. vehicle parts which were fixed relative to each other before can be moved opposite to each other in order to reduce crash forces, for example.

BRIEF DESCRIPTION OF THE DRAWINGS

Hereinafter the invention will be illustrated in detail by way of several embodiments and with reference to the enclosed drawings, in which:

FIGS. 29 and 30 are schematic views of an actuator according to the invention in accordance with another embodiment prior to and after activation.

DESCRIPTION OF EMBODIMENTS

Figure 1:
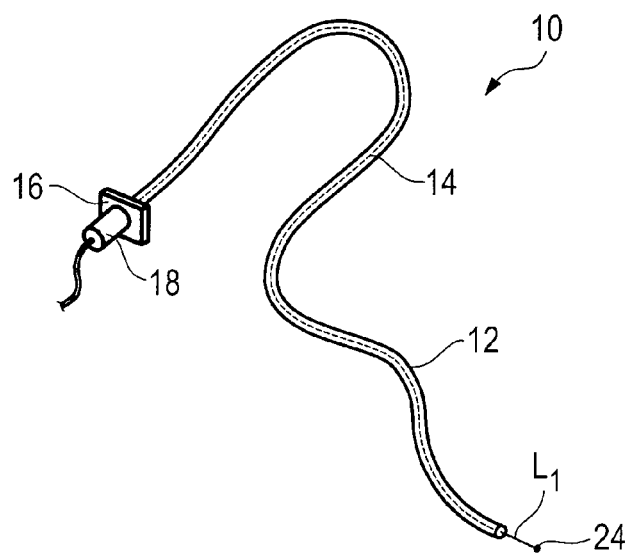
FIG. 1 shows a schematic view of an actuator according to the invention in accordance with a first embodiment consisting of a pyrotechnical element in the form of a shock tube and a wire gelded therein and made from a shape memory alloy, e.g. for use in a vehicle protection system according to the invention.

FIG. 1 illustrates a first embodiment of an actuator 10 comprising a pyrotechnical element 12 and a wire 14 made from a shape memory alloy.

The pyrotechnical element 12 in this case is a conventional shock tube. The wire 14 extends in elongate form through the hollow interior of the shock tube.

The shape memory alloy used can be a known alloy, for instance nickel-titanium or nickel-titanium-copper.

In its first cold state prior to ignition of the pyrotechnical element 12 the wire 14 has a thin elongate shape.

The wire 14 extends completely through the interior of the shock tube and is tightly attached at its one end to a mounting plate 16 of the actuator 10.

The pyrotechnical element 12, viz. the shock tube, too, is fastened at its one end to the mounting plate 16.

Moreover, an electrical igniter 18 contacting a pyrotechnical material 20 is arranged on the mounting plate 16, which material is applied as continuous coating to the inside of the shock tube, the latter igniting said material 20 when power is supplied. The igniter 18 contacts a control unit (not shown) and thus can be addressed depending on the situation, e.g. depending on the size and position of the person to be caught.

The mounting plate 16 is fixed to the vehicle in the mounted state and remains so during the entire activation of the actuator 10 and, resp., of the vehicle protection system.

Figure 2:
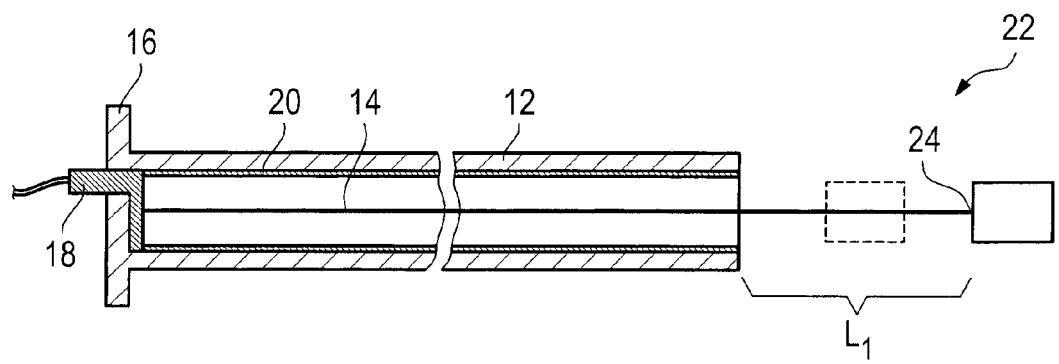
FIG. 2 shows a schematic sectional view across the actuator of FIG. 1 prior to igniting the shock tube.
Figure 3:
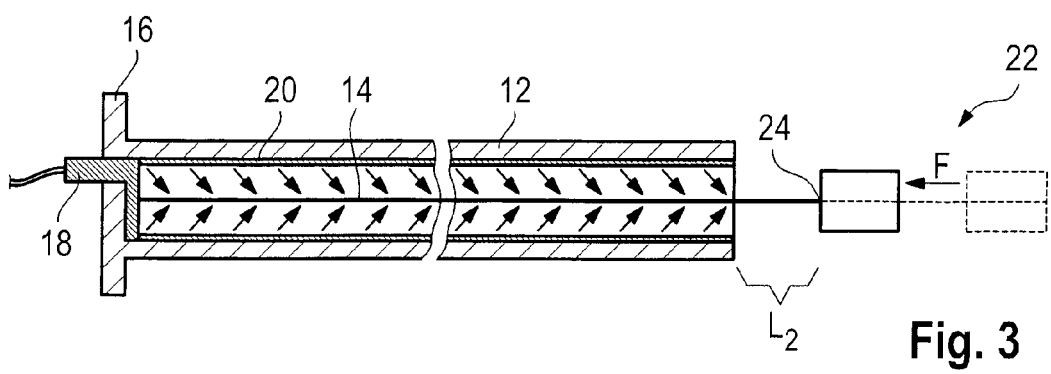
FIG. 3 shows the subassembly of FIG. 2 after igniting the shock tube.

The wire 14 is connected, for instance, to a regulating mechanism 22, one end 24 of the wire 14 acting on the regulating mechanism 22 so that the wire 14 can exert a tensile force F on the regulating mechanism 22 (schematically represented in FIGS. 2 and 3).

In its first state the end 24 of the wire 14 on the side of the regulating mechanism projects from the shock tube by a predetermined length $L_1$ (cf. FIG. 2).

The second state of the wire 14 adopted by the same during heating is chosen so that the wire 14 in total experiences a shortening $\Delta L$ and thickening and/or a buckling in portions (not shown). This change of shape takes place either over the entire length of the wire 14 or in a region in which the wire 14 extends inside the shock tube. As a result the predetermined length by which the wire 14 projects from the shock tube is reduced by the length $\Delta L$ to the length $L_2$ which is definitely shorter than the length $L_1$, for example by up to 10 cm.

Due to this change of length, the end 24 of the wire 14 exerts a tensile force F on the regulating mechanism 22.

The thermal energy required for heating the wire 14 is applied by the pyrotechnical material 20 inside the shock tube upon ignition thereof (cf. FIG. 3). Since the wire 14 extends through the interior of the shock tube, the wire 14 is quickly and uniformly heated over its entire length upon combustion of the pyrotechnical material 20 so that the shape of the wire 14 changes quickly and evenly.

For reasons of clarity, equal or very similar component parts are denoted with the same reference numerals in all embodiments.

Figure 4:
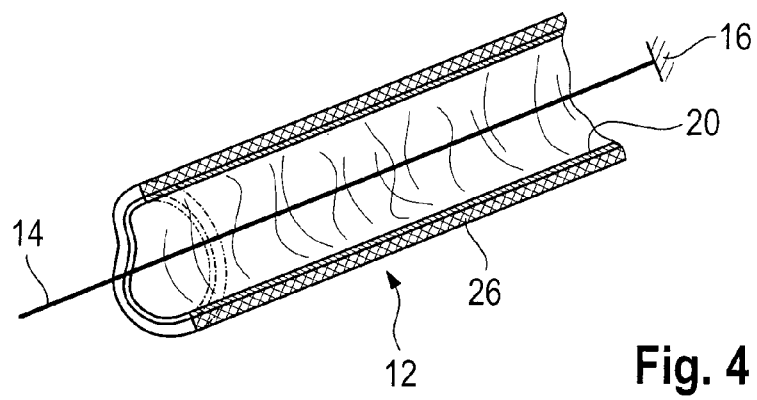
FIG. 4 shows a schematic view of an actuator according to the invention in accordance with a second embodiment consisting of a pyrotechnical element in the form of a coated fabric tube and a wire guided therein and made from a shape memory alloy, e.g. for use in a vehicle protection system according to the invention.

In the embodiment illustrated in FIG. 4 the pyrotechnical element 12 is formed by a tube 28 made from fabric and coated on the inside with the pyrotechnical material 20.

The shape-variable wire 14 extends through the inside of the fabric tube 26. The wire 14 is used as well as activated and heated just as in the afore-described embodiment.

Figure 5:
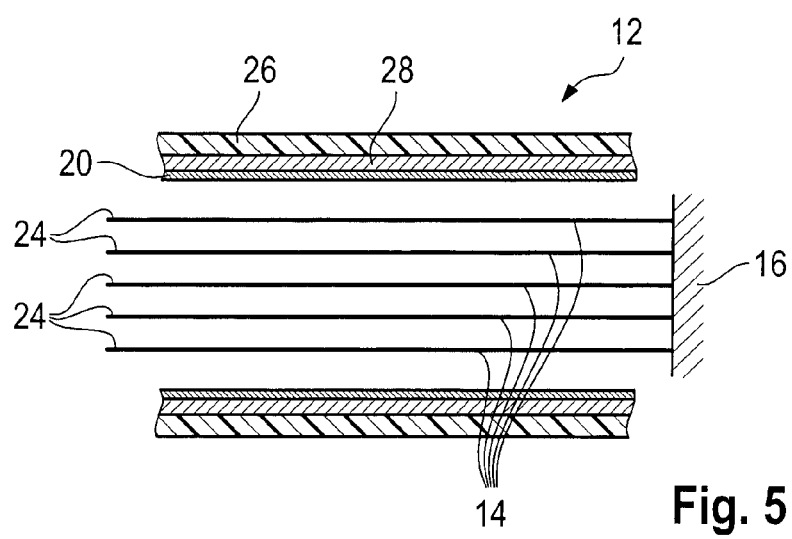
FIG. 5 shows a schematic view of an actuator according to the invention in accordance with a third embodiment consisting of a pyrotechnical element in the form of a coated and heat-insulated fabric tube and a plurality of wires guided therein and made from a shape memory alloy, e.g. for use in a vehicle protection system according to the invention.

FIG. 5 illustrates an embodiment in which the pyrotechnical element 12 includes a tube 26 made of plastic or fabric whose inside is covered with a heat insulation 28, for example a coating of an aerogel, reducing the heat transfer to the outside. The pyrotechnical material 20 is provided as the radially innermost layer applied as coating to the heat insulation 23.

In this example plural wires 14 variable in shape extend in the cavity inside the tubular pyrotechnical element 12 (in this case these are five wires, for example, but there could also be provided only one wire). Each of the wires 14 is fastened to the mounting plate 16 fixed to the vehicle. The free ends 24 of the wires 14 can lead to the same regulating mechanism 22 or to different regulating mechanisms 22.

Figure 6:
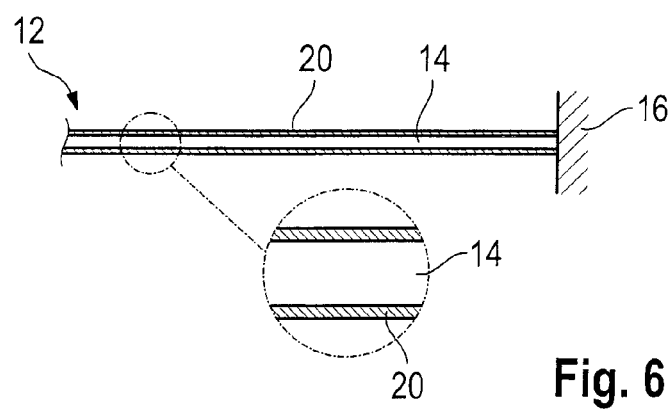
FIG. 6 shows a schematic view of an actuator according to the invention in accordance with a fourth embodiment consisting of a pyrotechnical element in the form of a coating of pyrotechnical material applied to a wire made from a shape memory alloy, e.g. for use in a vehicle protection system according to the invention.

In the embodiment shown in FIG. 6 the pyrotechnical material 20 is applied directly to the outer surface of the shape-variable wire 14 in the form of a coating. In this case the entire wire 14 is enclosed by the pyrotechnical material 20. The pyrotechnical element 12 is realized by the coating of pyrotechnical material 20 in this case.

The detail view in FIG. 6 illustrates an enlarged cutout of the wire 14 including the coating of pyrotechnical material 20.

Figure 7:
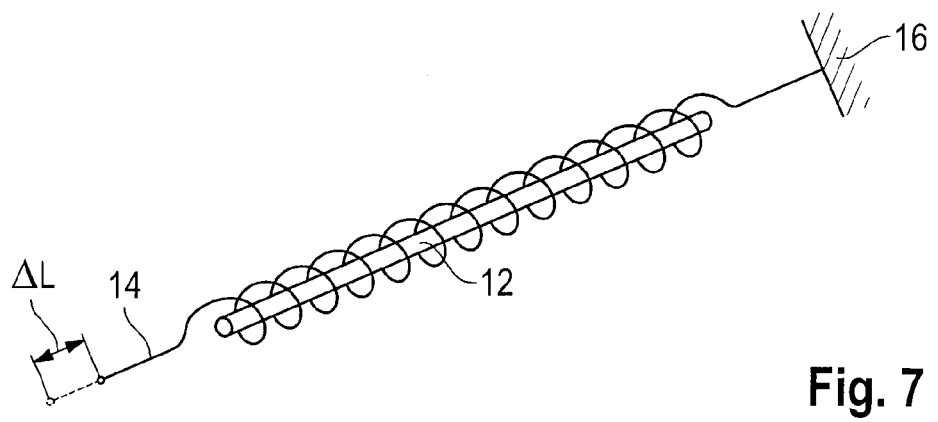
FIG. 7 shows a schematic view of an actuator according to the invention in accordance with a fifth embodiment consisting of a pyrotechnical element in the form of a member provided with a coating of pyrotechnical material end a wire guided on the outside thereof and made from a shape memory alloy, e.g. for use in a vehicle protection system according to the invention.
Figure 8:
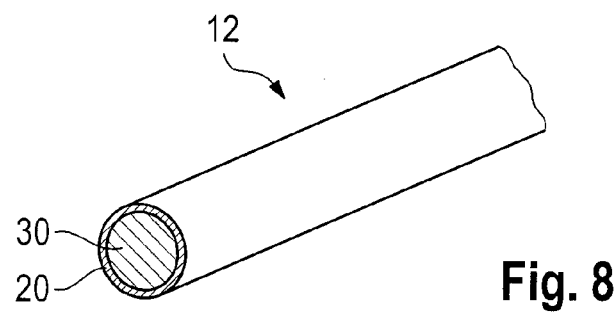
FIG. 8 shows the pyrotechnical element of FIG. 7.

In the embodiment illustrated in FIGS. 7 and 8 the pyrotechnical element 12 consists of a rigid member 30, here in the form of an elongate round rod provided with the pyrotechnical material 20 in the form of a coating covering the entire periphery of the member 30.

The shape-variable wire 14 is wound helically around the pyrotechnical element 12 in this case. In FIG. 7 the wire 14 is shown at a distance from the outer surface of the pyrotechnical element 12, but it can as well directly contact the surface thereof so as to increase the heat transfer.

The member 30 in this example is shown to be straight, but it may take any shape.

Figure 9:
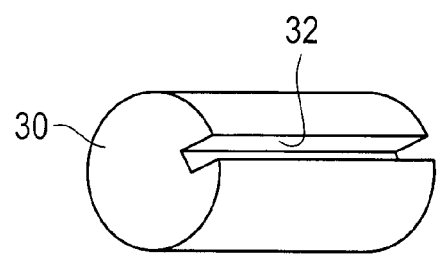
FIG. 9 shows a schematic view of a pyrotechnical element in the form of a member having a groove in which a wire made from a shape memory alloy can be guided.

FIG. 9 shows a variant of a member 30 having an elongate groove 32 which extends along the outer surface thereof and is configured for receiving the shape-variable wire 14. The member 30 is provided with the pyrotechnical material 20 either in total or only in the area of the groove 32 (not shown here).

Figure 10:
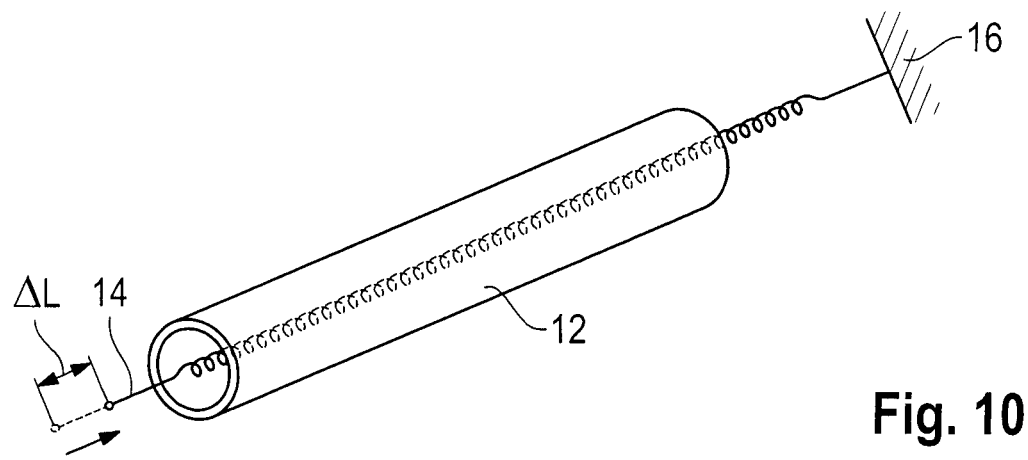
FIG. 10 shows a schematic view of an actuator according to the invention in accordance with a sixth embodiment consisting of a pyrotechnical element in tubular shape in the inside of which a helical wire made from a shape memory alloy is guided, e.g. for use in a vehicle protection system according to the invention.
Figure 11:
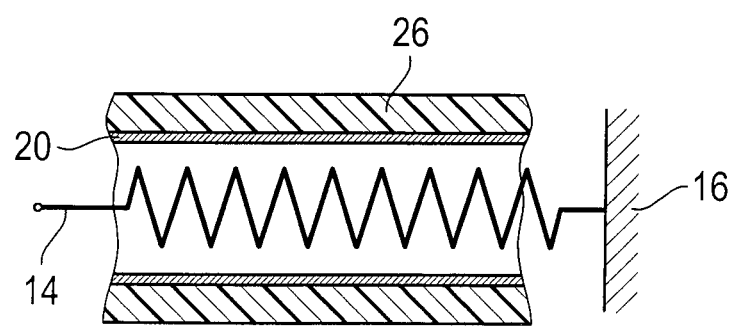
FIG. 11 shows a schematic view of an actuator according to the invention in accordance with a seventh embodiment consisting of a tubular pyrotechnical element in the inside of which a zigzag-shaped wire made from a shape memory alloy is guided, e.g. for use in a vehicle protection system according to the invention.

In both embodiments illustrated in FIGS. 10 and 11 the wire 14 does not extend through the pyrotechnical element 12 in an elongate form but in a curved or zigzag form so as to increase its efficient length and thus the efficient shortening length $\Delta L$.

In the case of the variant shown in FIG. 10, the wire is helically wound over a substantial part of its length, the helix extending through the inside of the tubular pyrotechnical element 12.

In the case of the variant shown in FIG. 11 the wire is zigzag-curved. Also in this case it extends through the tubular pyrotechnical element 12.

In all cases the pyrotechnical material 20 substantially extends continuously along the pyrotechnical element 12 so that the entire pyrotechnical material 20 burns off when it is ignited at one end of the pyrotechnical element 12.

Figure 12:
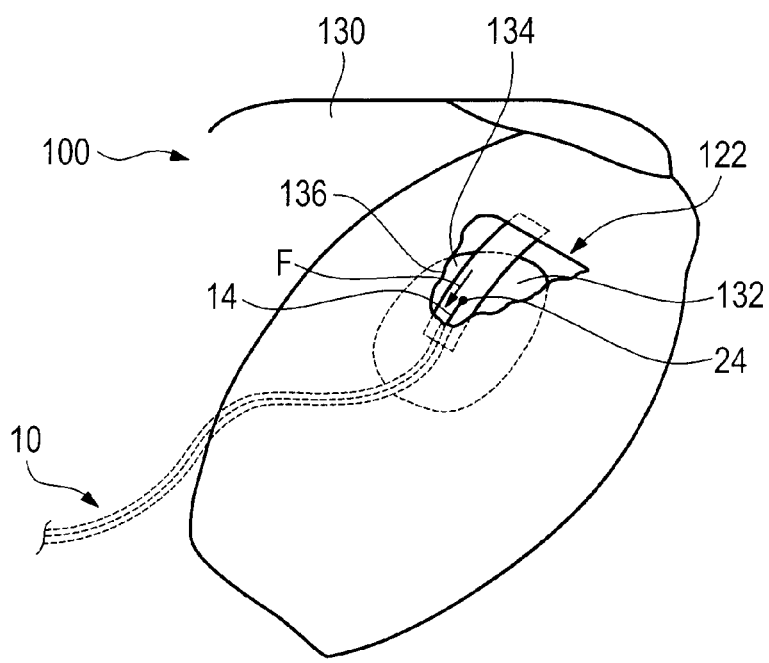
FIG. 12 is a schematic representation of a vehicle protection system according to the invention in the form of an airbag system in accordance with a first embodiment comprising a regulating mechanism.

FIG. 12 illustrates a vehicle protection system according to a first embodiment, here in the form of an airbag system 100 comprising an airbag 130 having an exhaust orifice 132 in a wall. A regulating mechanism 122 configured as venting mechanism here is fastened to the airbag wall in the area of the exhaust orifice 132. The exhaust orifice 132 is covered by a closing element 134 and is closed in a substantially gastight manner prior to activation of the regulating mechanism 122.

A prefabricated actuator 10 in this case extends from a mounting point fixed to the vehicle (not represented), for example on the vehicle-side mounting of an inflator providing the filling gas required for filling the airbag, across the interior of the airbag 130 to the regulating mechanism 122. The actuator 10 is arranged so that the end 24 of the wire 14 on the side of the regulating mechanism acts on the closing element 134.

For all embodiments of the vehicle protection system any actuator 10, especially one of the afore-described actuators 10, can be used.

The closing element 134 in the form of a fabric tab is fastened to the wall of the airbag 130 above the exhaust orifice 132 via tear seams 136. By the force F exerted on the wire end 24 and thus on the closing element 134 upon activation of the airbag system and deformation of the wire 14 the force required for destroying the tear seams 138 is exceeded so that the closing element 134 detaches from the exhaust orifice 132 end opens the same. From this moment gas may escape from the airbag 130 and the internal pressure in the airbag 130 is reduced.

Figure 13:
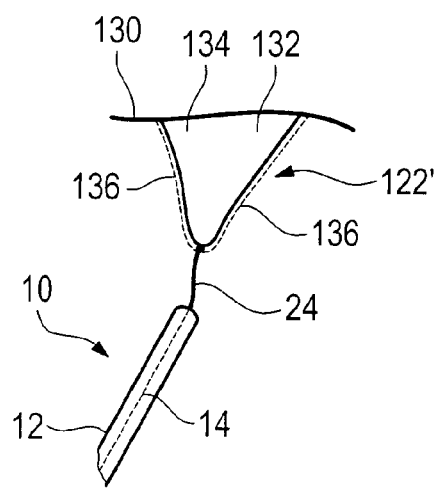
FIG. 13 schematically illustrates a variant of the regulating mechanism shown in FIG. 12.

FIG. 13 illustrates a variant of the regulating mechanism 122' in which the closing element 134 is fastened to the wall of the airbag 130 in the form of a flap by means of a tear seam 136. When the connecting point of the two tear seams 136 arranged in V shape is tensioned, the latter are unraveled and the triangular closing element 134 is forced outwards by the internal pressure of the airbag 130. In this way the exhaust orifice 132 is opened.

Figure 14:
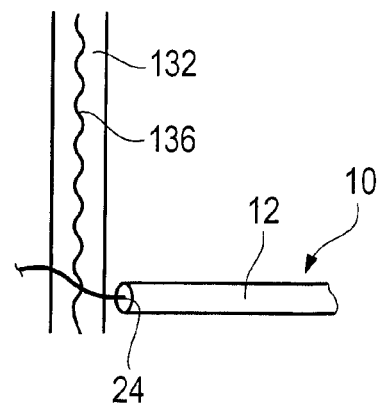
FIG. 14 schematically illustrates another regulating mechanism for an airbag system according to the invention.

In the variant illustrated in FIG. 14 the exhaust orifice 132 is formed by a silt in the airbag wall. A tear seam 136 first connects the rims of the exhaust orifice 132 and closes the latter. The end 24 of the wire 14 acts perpendicularly to the course of the tear seam 136 on the latter and pulls out the thread of the tear seam 136 when the wire 14 deforms so that the exhaust orifice 132 is opened.

Figure 15:
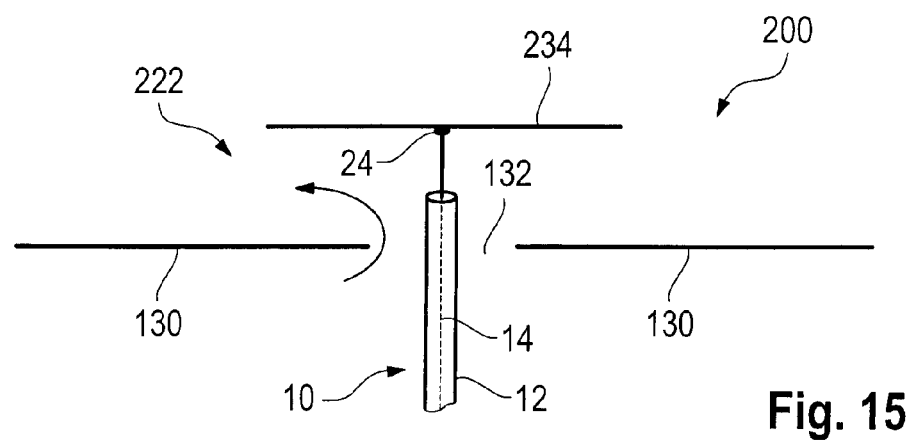
FIG. 15 is a schematic sectional view of an airbag system according to the invention in accordance with a second embodiment prior to activation of the regulating mechanism.
Figure 16:
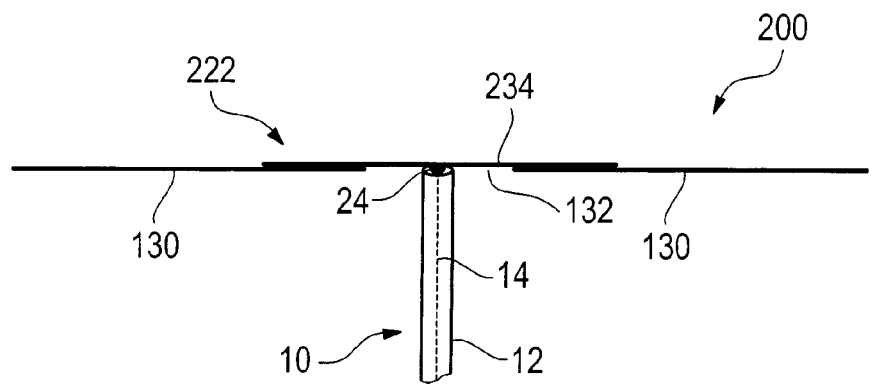
FIG. 16 shows the airbag system of FIG. 12 after activation of the regulating mechanism.

FIGS. 15 and 16 illustrate a second embodiment of an airbag system 200.

In this case the regulating mechanism 222 comprises a substantially rigid plate-shaped closing element 234 disposed in the area of the exhaust orifice 232. At the closing element 234 the end 24 of the wire 14 of the actuator 10 projecting from the pyrotechnical element 12 is fastened in the center so that the exhaust orifice 232 is opened prior to activation of the regulating mechanism 222. For this purpose, the closing element 234 is kept spaced apart from the airbag wall of the airbag 130 by the wire 14 so that gas can exhaust from the airbag 130 (cf. arrow in FIG. 15).

Upon activation of the regulating mechanism 222 by igniting the pyrotechnical element 12, the closing element 234 is pulled by the tensile force acting on the end 24 of the wire 14 toward the wall of the airbag 130 so that it closes the exhaust orifice 232 when the deformation of the wire 14 is completed.

The exhaust orifice 232 could also be initially closed by the closing element 234 and could be released by activating the regulating mechanism 222 and lifting or removing the closing element 234.

Figure 17:
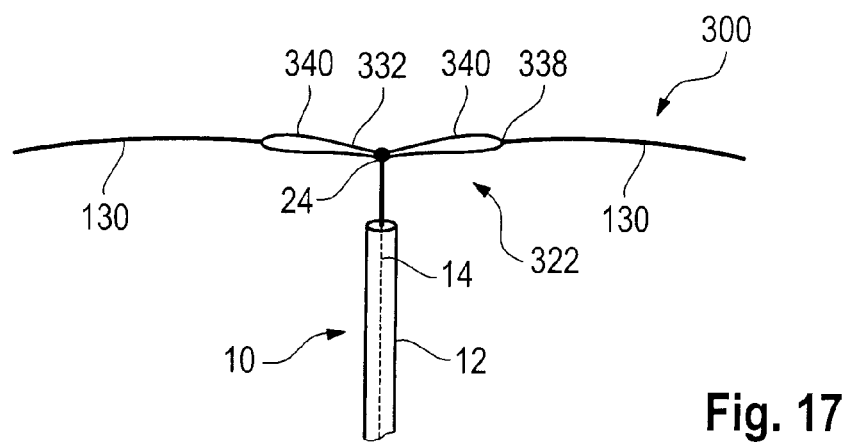
FIG. 17 is a schematic sectional view of en airbag system according to the invention in accordance with a third embodiment prior to activation of the regulating mechanism.
Figure 18:
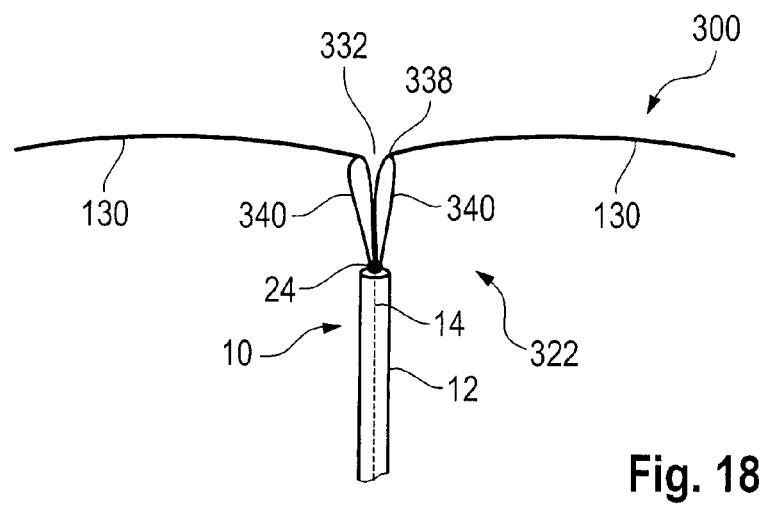
FIG. 18 shows the airbag system of FIG. 14 after activation of the regulating mechanism.
Figure 19:
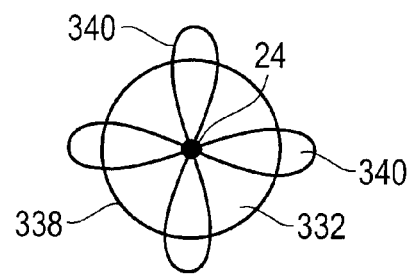
FIG. 19 shows a schematic detail of FIG. 14 illustrating the exhaust orifice of the airbag.
Figure 20:
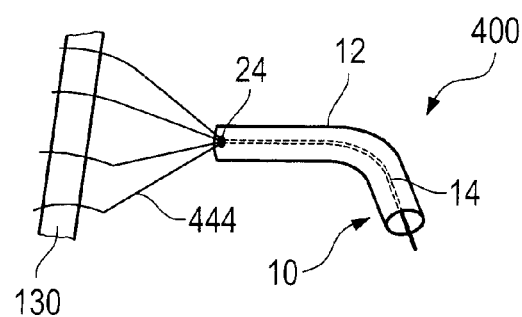
FIG. 20 shows an airbag system according to the invention in a schematic view in accordance with a fourth embodiment.

In FIGS. 17 to 19 a third embodiment of an airbag system 300 is shown. In this case at a rim 338 of the exhaust orifice 332 plural thread loops 340 (four in this case, cf. FIG. 19) are arranged all of which are connected to the end 24 of the wire 14 which is placed approximately in the center beneath the exhaust orifice 132 in the airbag 130.

Prior to activating the regulating mechanism 322 the thread loops 340 are substantially located in the plane of the wall of the airbag 130 so that the exhaust orifice 332 has the maximum surface area. Gas can escape from the airbag 130, as this is indicated by the arrow in FIG. 17.

After activating the regulating mechanism 322, which also in this case is a venting mechanism, the force exerted by deformation of the wire 14 retracts the end 24 of the wire 14 in the direction of the pyrotechnical element 12 so that the predetermined free length $L_1$ of the wire 14 is reduced. Also the thread loops 340 are pulled in the direction of the interior of the airbag to the pyrotechnical element 12 by this pulling motion.

Due to the tensile force exerted the rim 338 of the exhaust orifice 332 is pulled inwardly in funnel shape, thereby the free surface area of the exhaust orifice 332 being reduced and the exhaust orifice 332 being substantially adapted to be closed. Gas exhaust is reduced or inhibited so that the internal pressure of the airbag remains higher than with an opened exhaust orifice 332.

In the embodiments 200 and 300 the actuator 10 and especially the pyrotechnical element 12 extend inside the airbag 130.

FIGS. 20 to 24 illustrate a fourth embodiment 400 of an airbag system.

Figure 21:
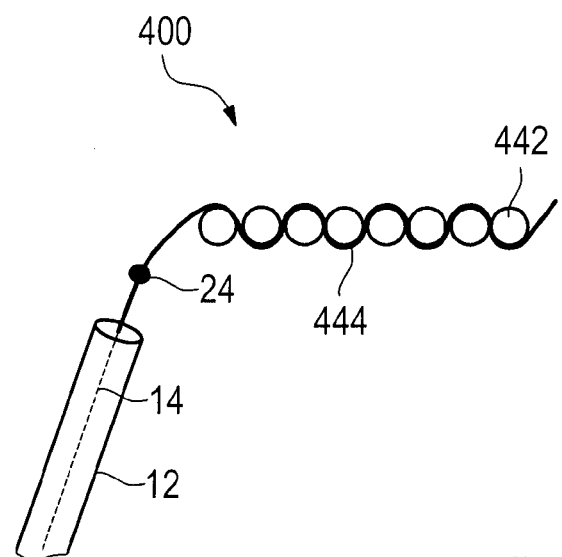
FIG. 21 shows a schematic sectional view of the airbag system of FIG. 12 prior to activation of the regulating mechanism.
Figure 22:
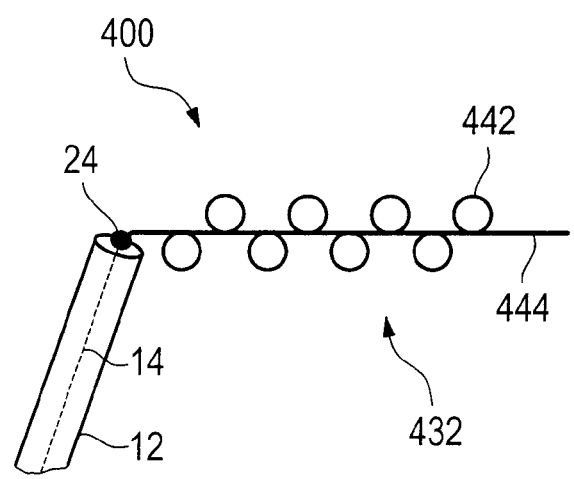
FIG. 22 shows the airbag system of FIG. 18 after activation of the regulating mechanism.

In FIGS. 21 and 22 the wall of the airbag 130 is shown in a schematically strongly enlarged version so that the warps 442 of the airbag fabric are visible. Plural threads 444 (indicated also in FIG. 20) are interwoven with the warps 442 so that they keep them together in a close and substantially gas-tight manner.

The threads 444 are configured and arranged so that they can be pulled out of the fabric of the airbag 130. This is done by the tensile force of the wire 14 acting on the end 24 of the wire 14 connected to the threads 444.

FIG. 22 shows the final condition in which after removing the threads 444 the fabric structure is opened by an increased space of the warps 442 so that the airbag fabric has become considerably more permeable to gas at this position. In this way an exhaust orifice 432 and an exhaust area, resp., is formed through which gas can escape from the airbag 130.

Instead of threads 444 interwoven with the warps 442 also some of the warps 442 themselves could be pulled out of the fabric (not shown in detail). In this case, too, the fabric in this area loses its gas tightness, the permeability to gas is increased and an exhaust orifice is formed.

Figure 23:
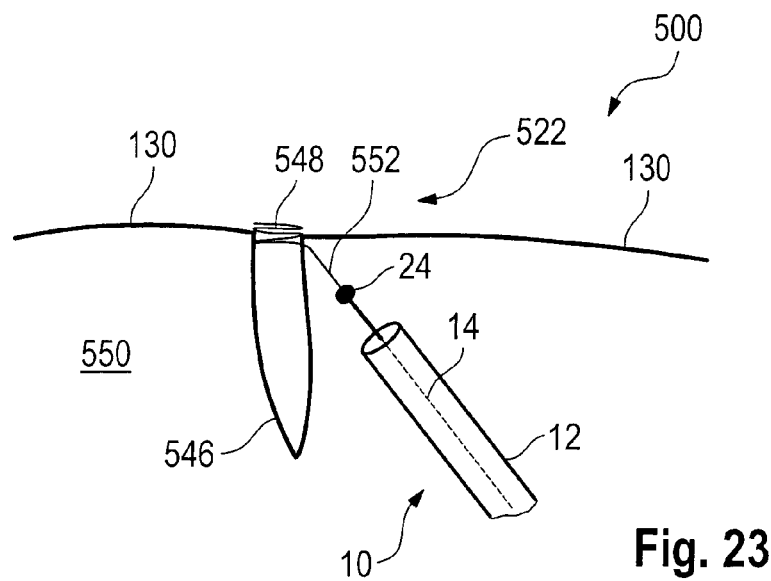
FIG. 23 shows an airbag system according to the invention in a schematic sectional view in accordance with a fifth embodiment prior to activating the regulating mechanism.
Figure 24:
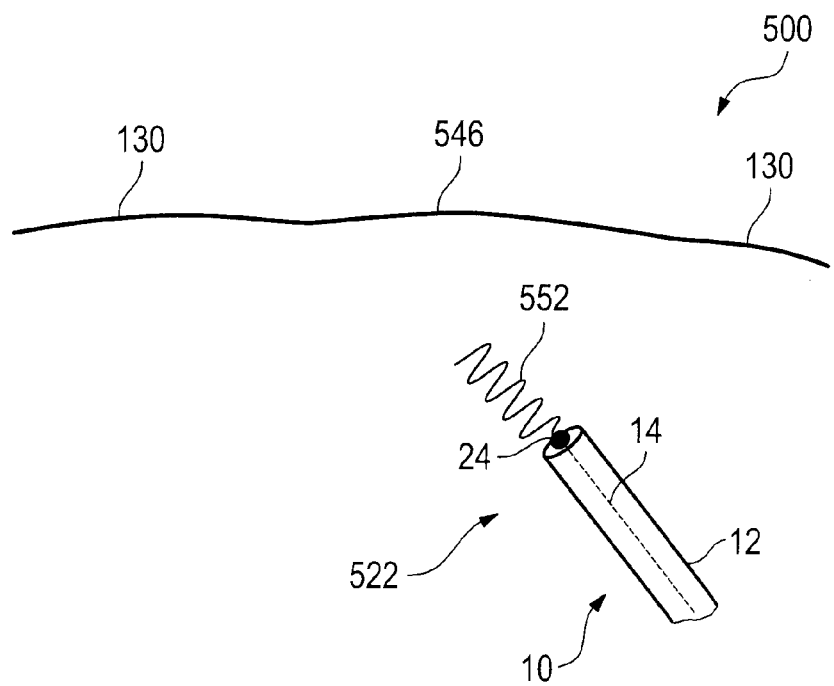
FIG. 24 shows the airbag system of FIG. 20 after activation of the regulating mechanism.

In the fifth embodiment of an airbag system 500 illustrated in FIGS. 23 and 24 the regulating mechanism 522 is in the form of a ventilation mechanism.

A portion 546 of the wall of the airbag 130 is separated from the residual airbag 130 by a tear seam 548 prior to activation of the regulating mechanism 522 so that a separated, initially unfilled partial volume 550 is formed.

The actuator 10 is arranged in or at the airbag 130 so that the end 24 of the wire 14 is connected to the tear seam 548 via a thread 552.

For activating the regulating mechanism 522 the end 24 of the wire 14 is moved in the direction of the pyrotechnical element 12, thereby the thread 552 unraveling the tear seam 548. Via the flow communication formed the separated partial volume 550 is filled with gas from the interior of the airbag 130. By increasing the total volume the internal pressure in the airbag 130 is appropriately reduced.

The separated partial volume 550 can be arranged, as shown here, on the surface of the airbag 130, but it could as well constitute an end area of the airbag 130.

After release of the tear seam 448 in this case the thread 552 is detached from the airbag 130 so that also the connection between the actuator 10 and the wall of the airbag 130 is disconnected in this case. The actuator 10 could as well remain connected to the airbag wall, however.

The airbag 130 can also have plural exhaust orifices adapted to be opened or closed e.g. according to similar or different variants as described.

Figure 25:
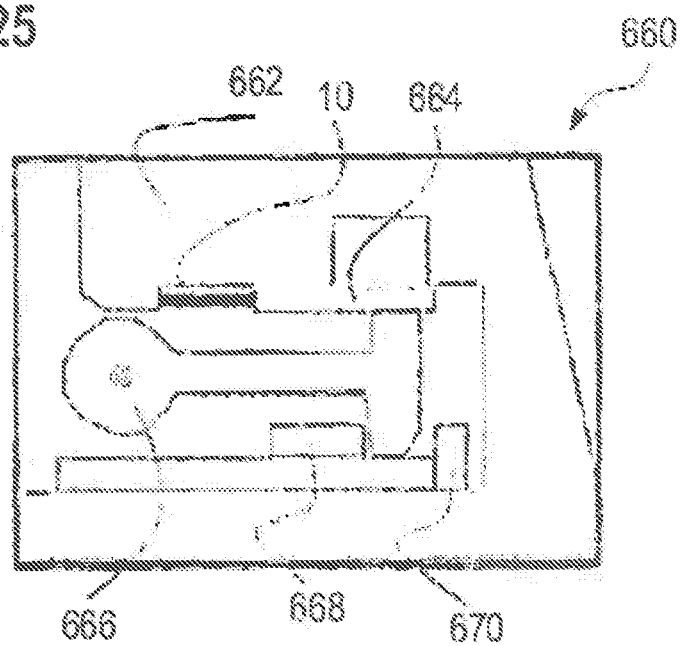
FIG. 25 is a schematic view of an unlocking mechanism comprising an actuator according to the invention for a vehicle protection system according to the invention in the locked state.
Figure 26:
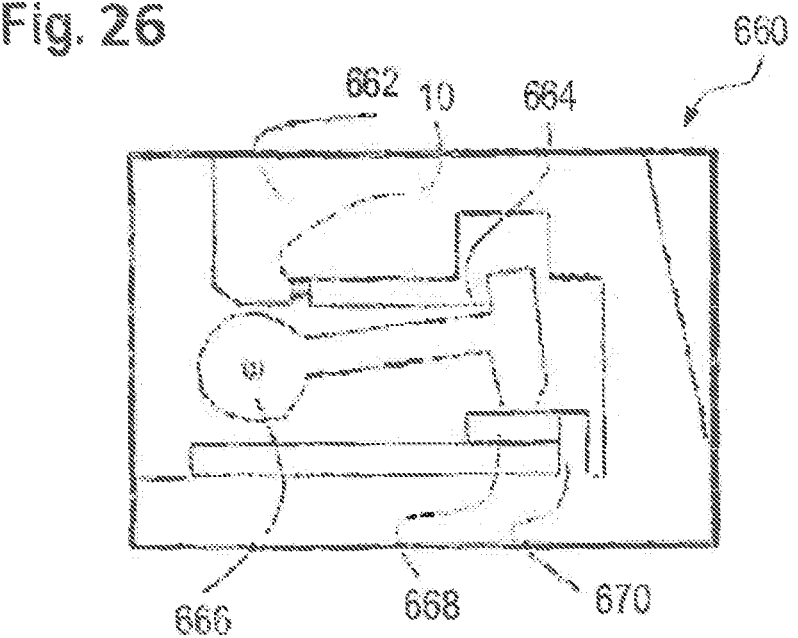
FIG. 26 shows the unlocking mechanism of FIG. 25 in the unlocked state.

FIGS. 25 and 26 illustrate the use of an actuator 10 in an unlocking mechanism 660 as it can be employed, for example, for permitting movement of vehicle parts which were fixed relative to each other before opposite to each other, especially in a vehicle protection system.

The actuator 10 is fastened to a frame 662 fixed to the vehicle and includes a movable component 664 movably guided at said frame 662. In this case formed by a locking bar.

In the locked state shown in FIG. 25 the locking bar blocks the movement of a pivoted lever 666 about the pivot axis thereof, as the head of the lever 666 is adjacent to the locking bar.

The lever 666 in turn prevents movement of a component 668 loaded against the head of the lever 868, the component being connected to a vehicle part to be moved (not shown).

When the actuator 10 is activated, the locking bar is pulled away from the head of the lever 666 by change of shape of the wire 14 (not shown here), and the lever 666 is pivoted into a recess at the frame 662 by the force acting through the component 668. Thus the component 668 is released and displaced until it is stopped by a stop 670.

Devices which are adapted to be unlocked by such unlocking mechanism 660 inter alia comprise switchable belt force limiters of different force levels, the control of a valve in a belt tensioner for supplying or discharging compressed gas, disconnection of the fuel supply to an internal combustion engine in the case of crash, connection of additional stiffening elements in the vehicle body, e.g. in the doorframe, for permitting better protection in the case of crash or a crash dampening which allows e.g. displacing the steering wheel in the direction of the steering column or an entire forward area of the vehicle for damping an impact, or any other quick-disconnect devices in which a loaded component has to be released within short time.

Figure 27:
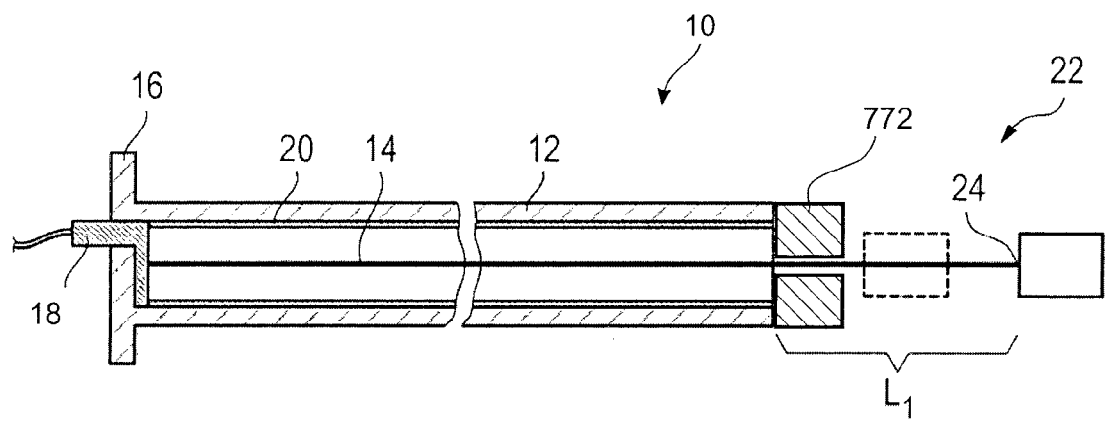
FIGS. 27 and 28 are schematic sectional views of an actuator according to a further embodiment prior to and after activation.
Figure 28:
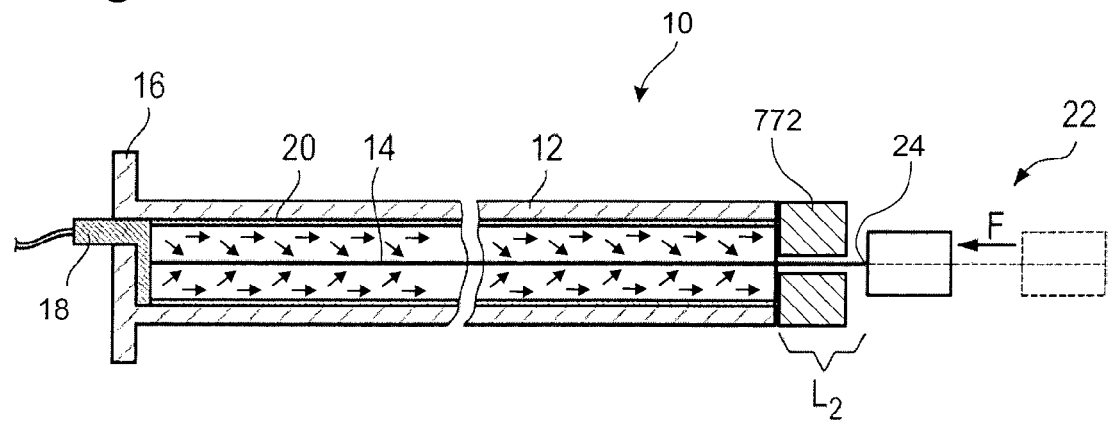

In FIGS. 27 and 28 an actuator 10 is illustrated in another embodiment in which an electrically ignited pyrotechnical element 12, e.g. a conventional inflator, is used. The inflator in this case is reduced as far as possible regarding the gas development, but is optimized regarding its heat development so that the shape-variable wire 14 extending in its interior is sufficiently heated.

The generated gas flow can also be used to heat more than one shape-variable wire 14 (not shown).

By shortening the shape-variable wire 14 (cf. FIG. 28) e.g. a belt tensioning function for a belt buckle, an end fitting and/or a belt retractor is triggered.

A movement within the range of milliseconds is realized by the rapid heat development of the inflator.

The generated gas is filtered in a filter 772 and/or is partly or completely absorbed so that gas and heat substantially do not get to the surroundings.

FIGS. 29 and 30 show an actuator 10 comprising plural slides 874 which are juxtaposed and are accommodated and guided to be linearly movable in a housing 876. In this example, four slides 874 are provided all of which have a straight outer contour. Neighboring slides 874 are connected via one or more shape-variable wires 14, each wire 14 extending from a mounting in the area of the upper end of a slide 874 to a mounting in the area of the lower end of the neighboring slide 874. The first shape-variable wire 14 of the cascade is anchored to an element 878 fixed to the housing.

The wires 14 are heated by electric correct flow in this case. A power supply 880 is connected to the wire 14 fastened to the element 878 fixed to the housing. From there the current flows linearly via the wires 14 and the interposed slides 874 which are electrically insulated against each other as a matter of course. The current circuit is closed by the end of the last wire 14 of the series.

It is also possible as an alternative or in addition to heat the shape-variable wires 14 pyrotechnically or chemically.

Reaction times of less than 10 msec can be reached.

Upon activation of the actuator 10 the shape-variable wires 14 contract due to the heating. Each wire 14 lifts the slide 874 at the lower end of which it is mounted by a predetermined distance. The neighboring slides 874 mutually guide each other. The total movement adds up so that the last slide 874 of the cascade is lifted by a distance □L corresponding to the stroke of each individual slide 874 multiplied by the number of slides 874.

In a variant not shown plural actuators are connected in parallel so as to generate a higher total force.

Figure 31:
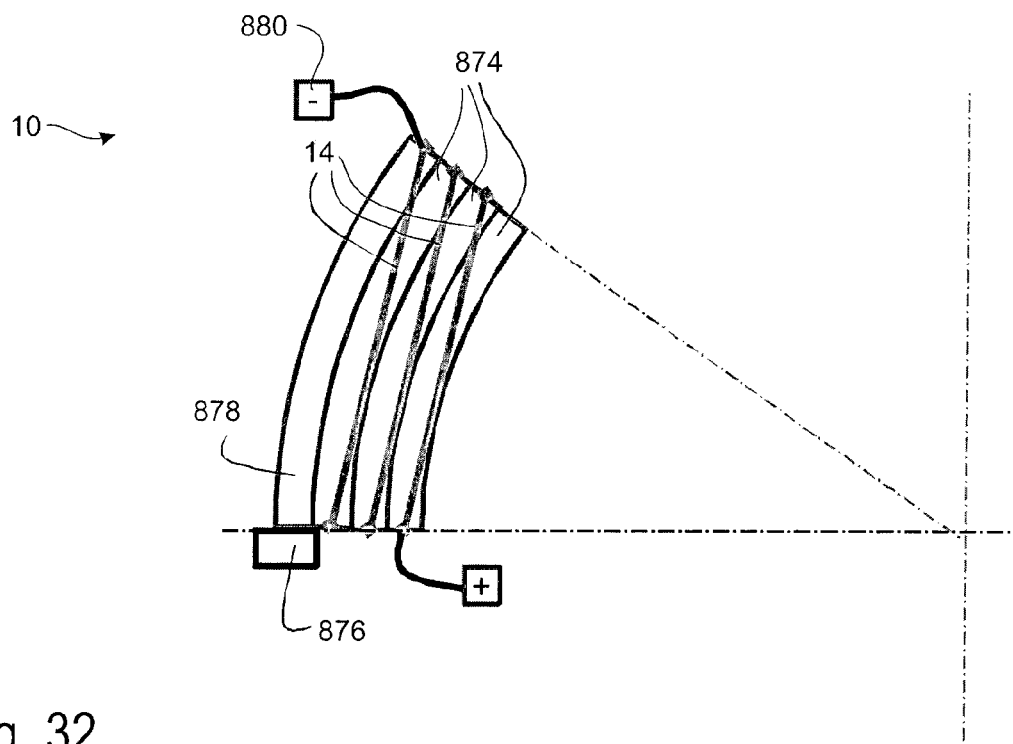
FIGS. 31 and 32 show a schematic view of an actuator according to the invention in accordance with a further embodiment prior to and after activation.
Figure 32:
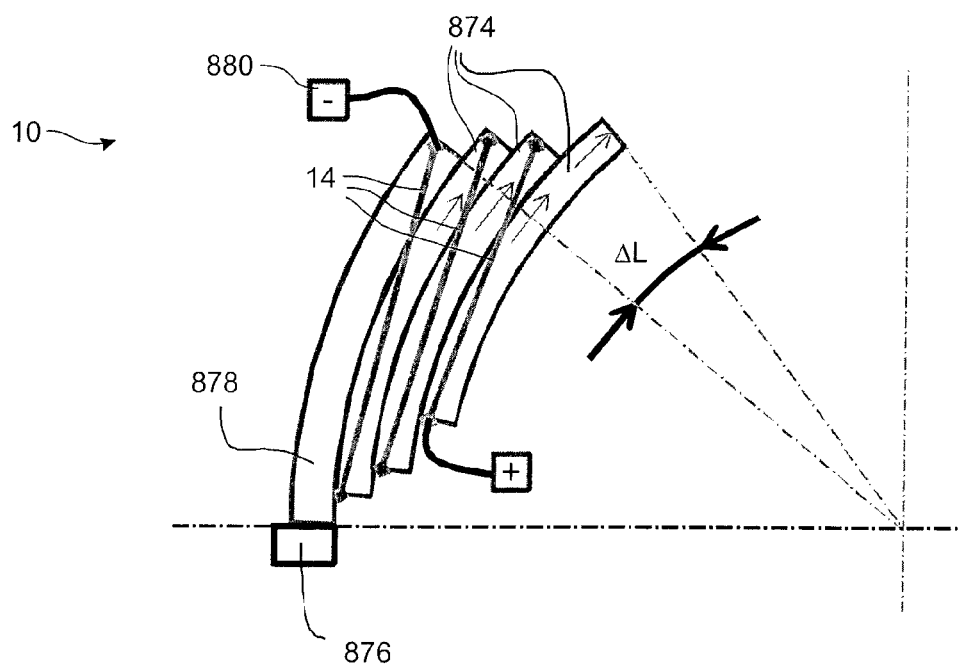

In the embodiment of an actuator 10 shown in FIGS. 31 and 32, rotational movement is generated by the aforedescribed system of cascading. In this case the slides 874 (in this case three slides 874 are provided) are not arranged to be linearly movable but to be movable along a circular arc so that the movement of the individual slides 874 adds up to a displacement □L of the last slide 874 of the cascade along a circular arc. The circular movement is resulting from a curved outer contour of the individual slides 874.

All described actuators can also be used in other technical fields apart from a vehicle protection system, as a mater of course.

All features of all described embodiments, both regarding the configuration of the actuator 10 of the pyrotechnical element 12 and the shape-variable wire 14 and regarding the configuration of the vehicle protection system, especially the regulating mechanisms of the airbag system, can be freely combined with or exchanged for each other at the discretion of those skilled in the art.

The invention claimed is:

1. An actuator for a vehicle protection system, comprising at least one wire (14) variable in shape depending on temperature made from a shape memory alloy and comprising an elongate pyrotechnical element (12) connected to the shape-variable wire (14) so that the wire (14) is heated upon ignition of the pyrotechnical element (12) and experiences a change of length, wherein the pyrotechnical element (12) is a shock tube.

2. The actuator according to claim 1, wherein the pyrotechnical element (12) substantially extends over the entire length of the shape-variable wire (14).

3. The actuator according to claim 1, wherein the wire (14) extends at least in portions through the pyrotechnical element (12) and/or at least in portions outside of the pyrotechnical element (12).

4. The actuator according to claim 1, wherein the shape-variable wire (14) extends in a curved form at least in portions.

5. The actuator according to claim 1, wherein the pyrotechnical element (12) includes heat insulation (28).

6. The actuator according to claim 1, wherein the wire (14) deforms upon heating so that it generates a tensile force (F).

7. The actuator according to claim 1, wherein prior to activation of the actuator the wire (14) projects from one end of the pyrotechnical element (12) by a predetermined length ($L_1$).

8. The actuator according to claim 1, wherein a filter (772) is provided for filtering and/or absorbing gas generated in the actuator (10).

9. The actuator according to claim 1, wherein plural slides (874) arranged to be linearly or rotationally movable are provided, wherein neighboring slides (874) are connected by at least one shape-variable wire (14).

10. A vehicle protection system comprising an actuator (10) comprising at least one wire (14) variable in shape depending on temperature made from a shape memory alloy and comprising an elongate pyrotechnical element (12) connected to the shape-variable wire (14) so that the wire (14) is heated upon ignition of the pyrotechnical element (12) and experiences a change of length, wherein the vehicle protection system is an airbag system comprising an airbag (130) and includes a regulating mechanism (22; 122-522) for the internal airbag pressure, wherein the wire (14) of the actuator is connected to the regulating mechanism (22; 122-522) so that a change of shape of the wire (14) exerts a force (F) on the regulating mechanism (22; 122-522) and wherein the airbag (130) comprises a partial volume (550) which is separated in terms of flow from the remainder of the airbag (130) prior to activation of the actuator (10) and of the regulating mechanism (522) and that the regulating mechanism (522) is a ventilation mechanism connected to the wire (14) of the actuator (10) so that upon activation of the actuator (10) and of the regulating mechanism (522) gas flows into the separated partial volume (550).

11. The vehicle protection system according to claim 10, wherein the regulating mechanism (122-422) further includes a venting system and the airbag (130) includes at least one exhaust orifice (132-432) which can be opened and/or closed by the venting mechanism.

12. The vehicle protection system according to claim 11, wherein the venting mechanism includes a closing element (134; 234) fastened to the airbag (130), the wire (14) of the actuator (10) acting on the closing element.

13. A vehicle protection system comprising an actuator (10) comprising at least one wire (14) variable in shape depending on temperature made from a shape memory alloy and comprising an elongate pyrotechnical element (12) connected to the shape-variable wire (14) so that the wire (14) is heated upon ignition of the pyrotechnical element (12) and experiences a change of length, wherein the vehicle protection system is an airbag system comprising an airbag (130) and includes a regulating mechanism (22; 122-522) for the internal airbag pressure, wherein the wire (14) of the actuator is connected to the regulating mechanism (22; 122-522) so that a change of shape of the wire (14) exerts a force (F) on the regulating mechanism (22; 122-522), wherein the regulating mechanism (122-422) is a venting system and the airbag (130) includes at least one exhaust orifice (132-432) which can be opened and/or closed by the venting mechanism, wherein the venting mechanism includes a closing element (134; 234) fastened to the airbag (130), the wire (14) of the actuator (10) acting on the closing element, and wherein in a first state with a first shape condition of the wire (14) of the actuator (10) the closing element (234) is lifted off the exhaust orifice (232) so that gas can escape from the exhaust orifice (232) and in a second state with a second shape condition of the wire (14) of the actuator (10) closes the exhaust orifice (232).

14. A vehicle protection system comprising an actuator (10) comprising at least one wire (14) variable in shape depending on temperature made from a shape memory alloy and comprising an elongate pyrotechnical element (12) connected to the shape-variable wire (14) so that the wire (14) is heated upon ignition of the pyrotechnical element (12) and experiences a change of length, wherein the vehicle protection system is an airbag system comprising an airbag (130) and includes a regulating mechanism (22; 122-522) for the internal airbag pressure, wherein the wire (14) of the actuator is connected to the regulating mechanism (22; 122-522) so that a change of shape of the wire (14) exerts a force (F) on the regulating mechanism (22; 122-522), and wherein the regulating mechanism (122-422) is a venting system and the airbag (130) includes at least one exhaust orifice (132-432) which can be opened and/or closed by the venting mechanism, wherein the rim (338) of the exhaust orifice (332) is connected to the wire (14) of the actuator (10) so that a tensile force (F) exerted by the wire (14) reduces the surface area of the exhaust orifice (332).

15. A vehicle protection system comprising an actuator (10) comprising at least one wire (14) variable in shape depending on temperature made from a shape memory alloy and comprising an elongate pyrotechnical element (12) connected to the shape-variable wire (14) so that the wire (14) is heated upon ignition of the pyrotechnical element (12) and experiences a change of length, wherein the vehicle protection system is an airbag system comprising an airbag (130) and includes a regulating mechanism (22; 122-522) for the internal airbag pressure, wherein the wire (14) of the actuator is connected to the regulating mechanism (22; 122-522) so that a change of shape of the wire (14) exerts a force (F) on the regulating mechanism (22; 122-522), wherein the regulating mechanism (122-422) is a venting system and the airbag (130) includes at least one exhaust orifice (132-432) which can be opened and/or closed by the venting mechanism, and wherein the venting mechanism includes plural specific threads (444) in the airbag wall which are configured to be removable from the airbag wall upon tensile load, wherein the threads (444) are connected to the wire (14).

16. A vehicle protection system comprising an actuator (10) having at least one wire (14) variable in shape depending on temperature made from a shape memory alloy and comprising an elongate pyrotechnical element (12) connected to the shape-variable wire (14) so that the wire (14) is heated upon ignition of the pyrotechnical element (12) and experiences a change of length, wherein the actuator (10) can be additionally heated by applying an electric voltage.

* * * * *